United States Patent [19]

Sakuma et al.

[11] Patent Number: 4,893,916
[45] Date of Patent: Jan. 16, 1990

[54] AUTOMATICALLY STORED VEHICLE MIRROR

[75] Inventors: Toranoosuke Sakuma; Hiroyuki Saitoh, both of Shizuoka, Japan

[73] Assignee: Koito Seisakusho Co., Ltd., Tokyo, Japan

[21] Appl. No.: 154,647

[22] Filed: Feb. 10, 1988

[30] Foreign Application Priority Data

Feb. 10, 1987 [JP] Japan ................... 62-27230

[51] Int. Cl.⁴ ................ G02B 5/08; G02B 7/18; B60R 1/06
[52] U.S. Cl. ..................... 350/637; 248/478; 248/900; 350/604; 350/633
[58] Field of Search ............ 350/632, 633, 634, 635, 350/636, 637, 604, 605, 606; 248/478, 479, 900

[56] References Cited

U.S. PATENT DOCUMENTS

| | | | |
|---|---|---|---|
| 4,202,603 | 5/1980 | Miyauchi | 350/634 |
| 4,443,057 | 4/1984 | Bauer et al. | 350/637 |
| 4,626,083 | 12/1986 | Nakayama et al. | 350/637 |
| 4,626,084 | 12/1986 | Kumai | 350/637 |
| 4,660,944 | 4/1987 | Suzuki et al. | 350/632 |
| 4,681,409 | 7/1987 | Enomoto | 350/637 |
| 4,699,024 | 10/1987 | Iida et al. | 350/637 |
| 4,786,156 | 11/1988 | Kotani et al. | 350/637 |

FOREIGN PATENT DOCUMENTS 61-12452  1/1986  Japan .

Primary Examiner—Rodney B. Bovernick
Assistant Examiner—Martin Lerner
Attorney, Agent, or Firm—Koda & Androlia

[57] ABSTRACT

An electrically and manually operable mirror for a vehicle including a base, a housing rotatably coupled to the base, a transmission gear rotatably coupled to the base and provided between the base and the mirror, a first clutch provided between the transmission gear and the housing, a second clutch provided between the transmission gear and the base and a motor for driving the transmission gear when electric power is applied to the motor.

6 Claims, 3 Drawing Sheets

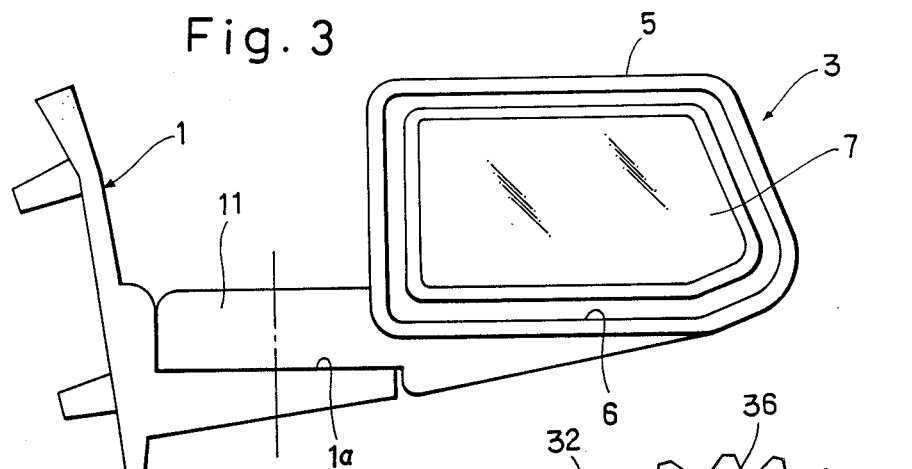
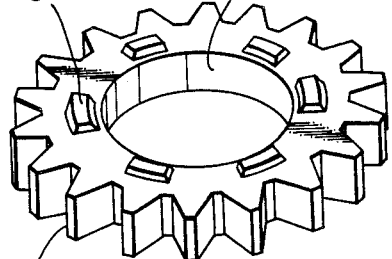
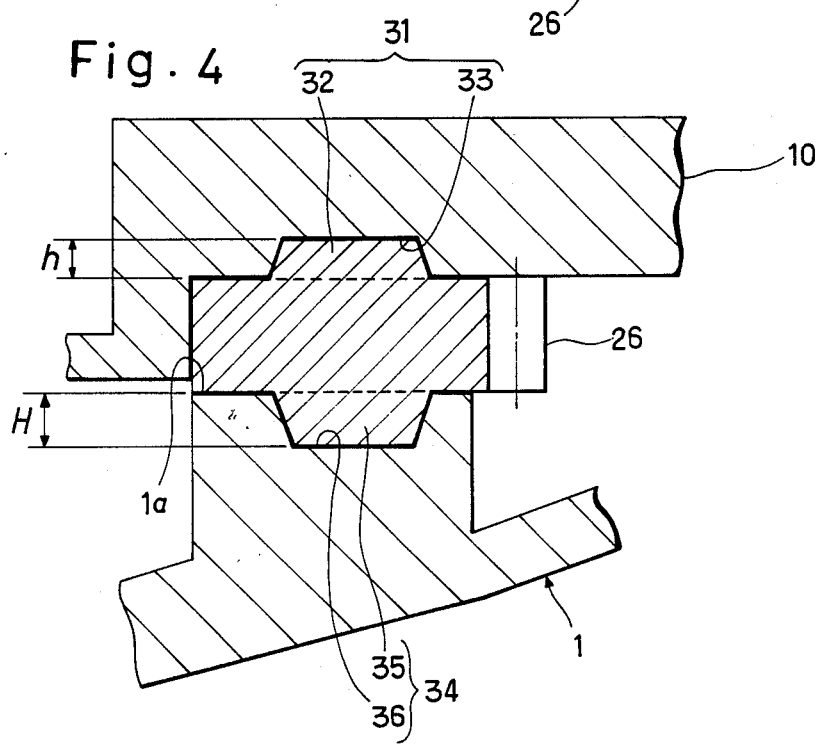

4,893,916

AUTOMATICALLY STORED VEHICLE MIRROR

BACKGROUND OF THE INVENTION

1. Field of the Invention

This invention relates to electrically operated exterior storage-type mirrors that are installed on a vehicle door which are automatically stored along the door surface and are remotely controlled from the driver's seat.

2. Prior Art

In the prior art there exist electrically operated exterior storage-type vehicle mirrors. An example of such is shown in Japanese Patent Laid-Open Publication No. 61-12452 and includes a base for mounting on the door of a vehicle to which is provided a shaft. The mirror body is rotatably mounted on the shaft so as to be freely rotatable in both directions around the vertical shaft on the base. In addition, the body is pushed towards the upper surface of the base by a spring, and clutches are provided between the upper surface of a clutch gear and a lower surface of a fixed clutch plate and also between a lower surface of the frame and an upper surface of the base. These two clutches comprise upper and lower clutches and the upper clutch is structured such that it engages more tightly than the lower clutch so that the lower clutch will disengage quicker than the upper clutch at the time the mirror body is turned. Furthermore, the clutches are each comprised of a multiple number of balls and concave parts into which the balls fit smoothly.

While the above described structure which is of an electromotive type is functional, it contains certain problems. In particular, since the above described structure is provided with a clutch placed at the upper end parts of the shaft and another clutch placed at the lower end parts of the shaft, the size of the structure which provides the two clutches is large and comples requiring many moving parts.

SUMMARY OF THE INVENTION

Accordingly, it is a general object of the present invention to overcome the disadvantages of the prior art. In particular, it is an object of the present invention to provide an automatically storable vehicle mirror which can be made small in size, has a few number of parts, has a simple structure and is lower in cost to manufacture.

It is another object of the present invention to provide an electrically operated exterior storage-type mirror which prevents damage to the mirror housing and the motor during overload.

In keeping with the principles of the present invention, the objects are accomplished by a unique electrically operated exterior storage-type mirror for vehicle doors which includes two clutches inserted between the base which is anchored to the automobile body and the mirror housing. The mirror housing is rotatably coupled to the base so as to be rotatable in the forward and backward directions and the clutches allow the mirror housing to rotate automatically and manually.

BRIEF DESCRIPTION OF THE DRAWINGS

The above mentioned features and objects of the present invention will become more apparent with reference to the following description and drawings wherein like reference numerals denote like element and in which:

FIG. 3 is a plan front view of the exterior of the present invention;

FIG. 4 is a magnified cross-sectional view of a clutch in accordance with the teachings of the present invention; and FIG. 5 is a magnified perspective view of the transmission gear utilized in the present invention.

DETAILED DESCRIPTION OF THE INVENTION

Figure 1:
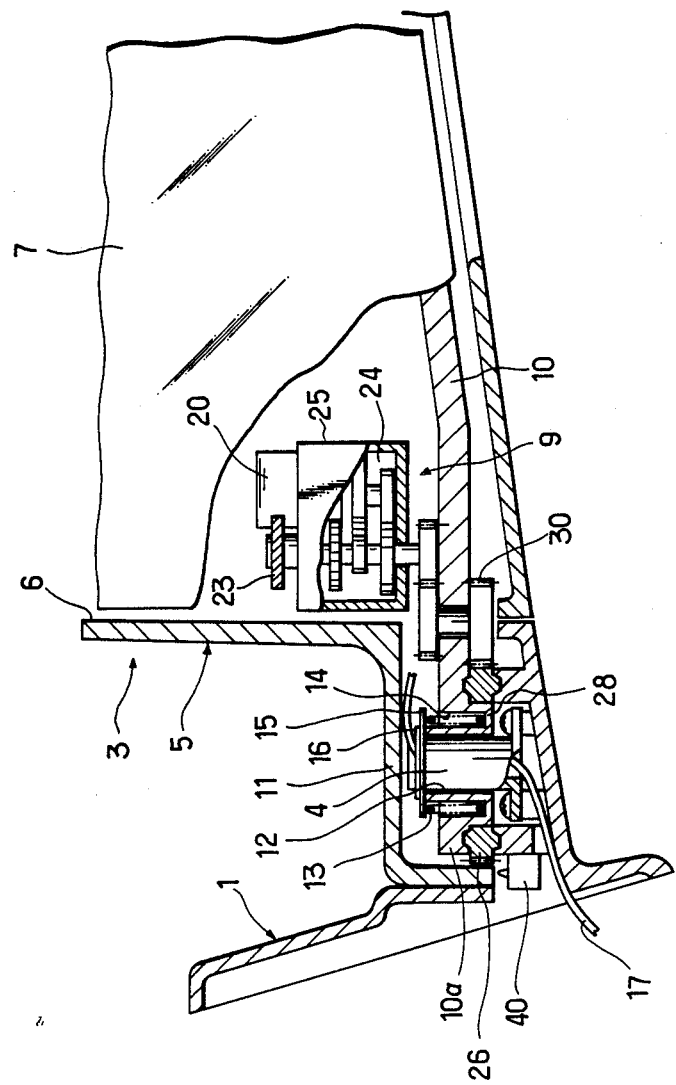
FIG. 1 is a partial open front view of the principal parts of one embodiment of the present invention.

Referring more particularly to the drawings, in the Figures reference numeral 1 denotes a simplified L-shaped base anchored to the door 2 of the vehicle body, reference numeral 3 denotes a sideview mirror assembly rotatably coupled to the shaft 4 which extends vertically from the upper surface 1a of the base 1 so as to be freely rotatable forwardly and rearwardly of the vehicle body. The mirror 3 includes a mirror housing 5 which is of a simplified box shape having an opening 6 extending towards the rear of the vehicle body. A mirror plate 7 is provided in the opening 6 of the mirror housing 5 and is movable by being leaned in any of 360° directions. The mirror plate 7 is remotely controlled from the driver's seat to move in any of the 360° directions by a known mirror activating means 8 which is shown, for example, in U.S. Pat. No. 4,202,603. A mirror storage mechanism 9 if situated within the mirror housing 5 and allows the mirror 3 to be moved forwardly and rearwardly by remote control from the driver's seat.

Also, a bracket 10 is anchored to the lower part and within the mirror housing 5, and the mirror activating means 8 and the mirror storage mechanism 9 are connected to the bracket 10. One edge 10a of the bracket 10 is inserted within a stay 11 which is coupled to the mirror housing 5 and protrudes towards the base 1. The lower portion of the stay 11 is opened. The stay 11 is provided with a hole 12 and a cylindrically shaped blind hole 14. The blind hole 14 through which the shaft 4 extends, stores the lower end of a spring 13 which applies downward pressure to the bracket 10. The blind hole 14 is coaxial with the hole 12 and is open at the upper surface of the edge 10a of the bracket 10.

A washer 15 is placed onto the upper outer end of the shaft 4 and the bottom surface thereof is engaged with the upper end of the spring 13. A stopping ring 16 is also provided on the shaft 4 above the washer 15 to complete the coupling. A cord 17 extends through the base 1 and through an opening provided in the shaft 4 into the mirror housing 5 and connects the mirror moving means 8 and the storage mechanism 9 to a source of electrical power (not shown) and to the remote control.

The storage mechanism 9 itself includes an electric motor 20 for effecting mirror storage, a worm gear 22 provided on the output shaft 21 of the electric motor 20, a worm wheel 23 which engages with the worm gear 22 and a speed reducing gear train 25 which comprises six spur gears 24. A transmission gear 26 of the storage mechanism 9 is driven at a reduced speed by rotation of the motor 20 passing through the reducing speed gear mechanism 25 by means of the gear 30.

The transmission gear 26 is placed between the upper surface 1a of the base 1 and the lower surface of the bracket 10 and is coaxial with and rotates freely around the shaft 4. An upper clutch 31 is formed between the upper surface of the gear 26 and the lower surface of the bracket 10 while a lower clutch 34 is provided between the lower surface of the gear 26 and the upper surface 1a of the base 1. The upper clutch 31 is formed by convex parts 32 provided on the gear 26 and concave parts 33 provided in the lower surface of the bracket 10 (as can be seen in FIGS. 4 and 5). These convex and concave parts are provided in a plural number, for example, six pairs. The lower clutch 34 is formed by a plurality of, six for example, convex parts 35 formed on the bottom surface of the transmission gear 26 and concave parts 36 formed in the upper surface 1a of the base 1. Furthermore, the convex parts 32 and 35 and the concave parts 33 and 36 are provided concentrically with the axis of the shaft 4. In addition, the shape of the convex parts 32 and 35 and the concave parts 33 and 36 are substantially trapezoidal, however, other shapes would be suitable. In addition, the height h of each of the convex parts 32 is less than the height H of the convex parts 35. In this way, the engaging force between the convex part 32 and the concave parts 33 is smaller than the engaging force between the convex parts 35 and the concave parts 36 to allow the upper clutch 31 to disengage more quickly than the lower clutch 34 during the automatic storage cycle for the mirror 3.

It should be apparent that the upper and lower clutches 31 and 34 can be made in other ways such as using concave parts and balls as is described in U.S. Pat. No. 4,626,083. In particular, the upper clutch 31 could be formed by providing concave parts on the upper surface of the transmission gear 26 instead of convex parts 32 and providing a ball between the concave parts on the upper surface of the transmission gear 26 and concave parts 33 on the lower surface of the bracket 10. In a similar manner, the lower clutch 34 could be formed by providing concave parts on the lower surface of the transmission gear 26 instead of the convex parts 35 and providing a ball between the concave parts on the lower surface of the transmission gear 26 and the concave parts 36 on the upper surface 1a of the base 1. In addition, the balls provided for the upper clutch would be smaller in diameter than those provided for the lower clutch.

In addition to the above, a means 40 which is shown in FIG. 1 can be provided to detect the rotational angle of the mirror housing 1 and can be used as a limit switch for activating and controlling the motor 20 when storing the mirror 3.

In operation, when storing the mirror 3 utilizing the motor 20, by activating the motor 20 the rotation of the output shaft 21 is transmitted to the reducing gear mechanism 25 through the worm gear 22 and worm wheel 23. The reduced rotational speed is finally transmitted to the gear 30. At this time, the transmission gear 26 is prevented from rotating due to the clutches 31 and 34, but the gear 30 will continue to attempt to rotate the transmission gear 26 so as to store the mirror 3. Then and as a result of the difference between the height h and the height H of the convex parts 32 and 35, in the upper clutch 31 the convex parts 32 will disengage from the concave parts 33 since the engaging force is smaller. As a result, the convex parts 32 disengages from the concave parts 33 and pushes the bracket 10 towards the spring 13, thus allowing the bracket 10 to rotate towards the base 1 and the door 2 of the vehicle. As a result, the mirror 3 rotates in a clock-wise direction in FIG. 2 by the gear 30 revolving around the transmission gear 26 and the mirror 3 is stored along the door 2 as is shown by the two-dotted lines.

If there is an overload during the storing operation of the mirror 3 for any reason such as stopping the mirror manually during the electric storage operation, the convex parts 32 and 35 will disengage from the concave parts 33 and 36 due to the rotational force of the gear 30 and the clutches 31 and 34 will disengage. Therefore, the transmission gear 26 is free to rotate relative to both the base 1 and the bracket 10 and is rotated by the gear 30 to prevent overheating and burning out of the motor 20 due to an overload.

In order to return the mirror 3 to the use position from the storage position, the motor 20 rotates in an opposite direction by remote control operation and reverse rotation is transmitted at a reduced speed to the gear 30. The gear 30 rotates in an opposite direction around the transmission gear as it did during the storage operation. This rotation of the gear 30 is the same as during the storage operation except that it is in the opposite direction and it will cause the upper clutch 31 to be disengaged and allow the bracket 10 to rotate freely relative to the base 1 back to the use position. In addition, similar to the storing operation, the lower clutch 34 will not disengage and the transmission gear 26 will be prevented from rotating relative to the base 1.

Figure 2:
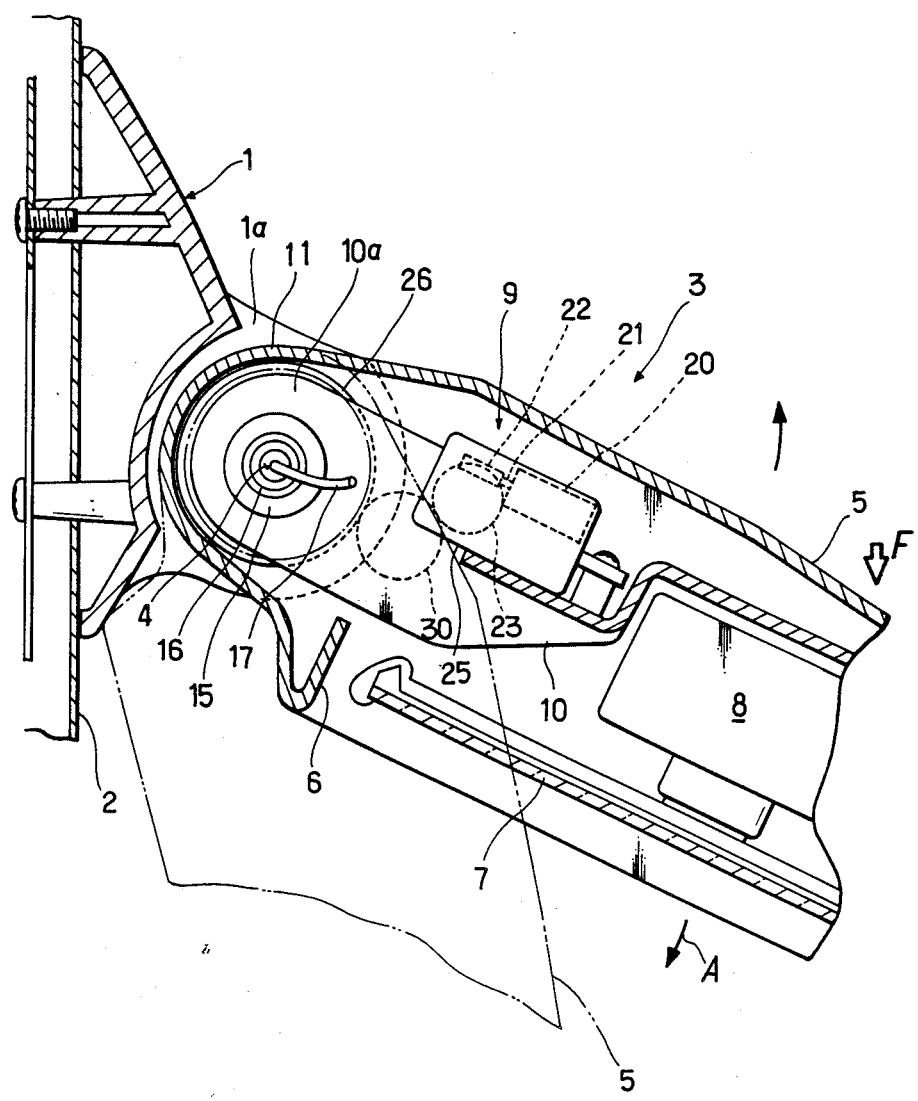
FIG. 2 is a transverse section of the principal parts of the present invention.

Next, to manually store the mirror 3, a force F in the direction of arrow A in FIG. 2 is applied to the mirror housing 5. As a result, the mirror 3 tries to rotate about the shaft 4 in FIG. 2 in the clock-wise direction and rotational torque between the gear 30 and the transmission gear 26 will result. At this time, the gear 30 is held in the non-rotational condition due to the speed reducing gear mechanism 25. Thus, the upper clutch 31 will not disengage and the transmission gear 26 is kept fixed relative to the bracket 10.

The transmission gear 26 is engaged with the base 1 by the lower clutch 34; however, when the force F overwhelms the engaging force of the convex parts 35 and concave parts 36, the clutch 34 disengages and rotates freely against the base 1. As a result, the gear 30 rotates together with the transmission gear 26 and the mirror 3 can be stored manually. Therefore, manual storage of the mirror 3 can be effected smoothly and damage due to overloading the mirror housing 5, motor 20 and speed reducing gear mechanism 25 is prevented.

It should be apparent to those skilled in the art that in the above construction since the major components of the storing means 9 are distributed in the main body of the mirror housing 5 and at the same time the two clutches 31 and 34 are provided within the stay 11 and are assembled at the upper and lower sides of the transmission gear, the stay 11 can be made narrow and low in height and the height of the mirror housing 5 itself can be lowered to provide a small mirror with a small coefficient of resistance to air flow, thus reducing energy consumption in the vehicle.

In addition to the above, while the method of controlling storage of the mirror 3 includes placing the limit switch 40 at the base 1 and turning on and off the switch 40 utilizing the bracket 10 to activate the motor 20 to cause it rotate forwardly and rearwardly, it is also possible to place the switch on the bracket 10. Furthermore, while only one switch 40 is shown and described and therefore, it is only possible to control the movement of the mirror from the in use position to the stored position, it would also be possible to utilize two switches 40 to make it possible to control the movement of the mirror from the in use position to the stored position and then back from the stored position to the in use position.

Moreover, it should be further apparent that while the upper and lower clutches 31 and 34 are described in terms of convex parts 32 and 35 placed on the transmission gear 26 and concave parts 33 and 36 provided respectively on the bracket 10 and the base 1, it would also be possible to reverse the construction such that the concave parts 33 and 36 are provided on the transmission gear 26. In addition, changes in the shape and size of the convex parts 32 and 35 and the concave parts 33 and 36 are possible so long as the engaging force of the upper clutch 31 is less than the engaging force of the lower clutch 34.

It should be apparent to those skilled in the art that the above described embodiment is merely illustrative of but one of the many possible specific embodiments which incorporate the principles of the present invention. Numerous and various other arrangements could be readily devised by those skilled in the art without departing from the spirit and scope of the invention.

We claim:

1. An electrically and manually operable exterior storage type mirror for a vehicle comprising:
   a base for mounting said storage type mirror to a body of said vehicle;
   a mirror housing rotatably coupled to said base;
   a transmission gear rotatably coupled to said base and provided between said base and said mirror housing;
   a first clutch means provided between one surface of said transmission gear and said mirror housing, said first clutch means comprising convex parts on said one surface of said transmission gear, concave parts on said mirror housing engaging with said convex parts and spring means for causing said convex and concave parts to be in resilient engagement;
   a second clutch means provided between another surface of said transmission gear and said base, said second clutch means having an engaging force greater than an engaging force of said first clutch, said second clutch means comprising convex parts on said another surface of said transmission gear, concave parts on said base engaging with said convex parts and spring means for causing said convex and concave parts to be in resilient engagement; and
   a means fixed to said mirror housing and provided within said mirror housing for rotating said transmission gear when electric power is applied to said means; and
   wherein the height of said convex parts of said first clutch is less than a height of said convex members of said second clutch.

2. A mirror according to claim 1, wherein said convex parts of said first and second clutch means are trapezoidal in shape.

3. A mirror according to claim 2, wherein said means for sensing the rotational position comprises a limit switch.

4. A mirror according to claim 1, wherein said means for rotating said transmission gear comprises an electric motor and a gear train provided between an output of said motor and said transmission gear.

5. A mirror according to claim 1, further comprising a means for sensing the rotational position of said mirror housing relative to said base.

6. An electrically and manually operable exterior storage type mirror for a vehicle comprising:
   a base adapted to be anchored to a body of said vehicle;
   a mirror housing rotatably coupled to said base;
   a transmission gear rotatably coupled to said base and provided between said base and said mirror housing;
   a means mounted within said mirror housing for rotating said transmission gear when electric power is applied to said means;
   a first clutch means provided between one surface of said transmission gear and said mirror housing, said first clutch means comprising convex parts on said one surface and concave parts on said mirror housing engaging with said convex parts;
   a second clutch means provided between another surface of said transmission gear and said base, said second clutch means having an engaging force greater than that of said first clutch means, said second clutch means including convex parts on said another surface and concave parts on said base engaging with said convex parts the height of said convex parts of said first clutch means being less than that of said convex parts of said second clutch means; and
   a spring means causing said convex and concave parts of said first and second clutch means to be in resilient engagement.

* * * * *

UNITED STATES PATENT AND TRADEMARK OFFICE
CERTIFICATE OF CORRECTION

PATENT NO. : 4,893,916

DATED : January 16, 1990

INVENTOR(S) : Toranosuke Sakuma, et al.

It is certified that error appears in the above-identified patent and that said Letters Patent is hereby corrected as shown below:

On the title page:

Column [75] Inventors: Change "Toranoosuke Sakuma; Hiroyuki Saitoh, both of Shizuoka, Japan" to --Toranosuke Sakuma; Hiroyuki Saitoh, both of Shizuoka, Japan--

Signed and Sealed this

First Day of January, 1991

Attest:

HARRY F. MANBECK, JR.

Attesting Officer

Commissioner of Patents and Trademarks